(12) United States Patent
Jacobson et al.

(10) Patent No.: US 8,468,542 B2
(45) Date of Patent: Jun. 18, 2013

(54) VIRTUAL ENVIRONMENT FOR SERVER APPLICATIONS, SUCH AS WEB APPLICATIONS

(75) Inventors: Neil A. Jacobson, Arlington, MA (US); John Sheehan, Cambridge, MA (US); Eric Jewart, Waltham, MA (US)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 12/717,146

(22) Filed: Mar. 4, 2010

(65) Prior Publication Data

US 2011/0219385 A1 Sep. 8, 2011

(51) Int. Cl.
*G06F 13/00* (2006.01)
(52) U.S. Cl.
USPC ............... 719/310; 719/311; 718/1; 717/174; 717/177
(58) Field of Classification Search
USPC ................ 719/310, 311; 718/1; 717/174, 177
See application file for complete search history.

(56) References Cited

U.S. PATENT DOCUMENTS

| | | | |
|---|---|---|---|
| 6,256,031 B1 | 7/2001 | Meijer et al. | |
| 7,210,125 B2 | 4/2007 | Chang et al. | |
| 7,257,705 B2 * | 8/2007 | Flam et al. | 713/100 |
| 7,383,535 B1 | 6/2008 | Kshetrapal et al. | |
| 2005/0289538 A1 | 12/2005 | Black-Ziegelbein et al. | |
| 2009/0007162 A1 * | 1/2009 | Sheehan | 719/331 |
| 2009/0133013 A1 | 5/2009 | Criddle et al. | |
| 2009/0199175 A1 | 8/2009 | Keller et al. | |
| 2009/0199178 A1 | 8/2009 | Keller et al. | |
| 2009/0228629 A1 | 9/2009 | Gebhart et al. | |
| 2009/0254899 A1 * | 10/2009 | Shlomai et al. | 717/174 |
| 2010/0037206 A1 | 2/2010 | Larimore et al. | |
| 2011/0238796 A1 * | 9/2011 | Faulk et al. | 709/220 |
| 2011/0287828 A1 * | 11/2011 | Anderson et al. | 463/25 |

FOREIGN PATENT DOCUMENTS

KR 10-2009-0017942 2/2009

OTHER PUBLICATIONS

Friedman, et al., "The Reality of Virtualization for Windows Servers", 2006, pp. 12.
Yu, Yang, "OS-level Virtualization and Its Applications", Dec. 2007, pp. 134.

* cited by examiner

*Primary Examiner* — Andy Ho
(74) *Attorney, Agent, or Firm* — Rau Patents, LLC

(57) ABSTRACT

An application virtualization system enables server applications, such as web applications to be easily deployable, separates an application and its state from the system, and allows applications to be easily moved to another server. The application virtualization system provides a way to isolate conflicts and allow multiple applications that provide conflicting information to run independently and avoid conflicts. The application virtualization system receives notification of an application preparation session and monitors the session to collect configuration information that the application uses to run on a client. The application virtualization system stores the collected information until the application to be virtualized is deployed. When an administrator later deploys the application, the system retrieves the stored information and uses the information and information from the client to reconstitute the metadata and virtualize the application.

20 Claims, 4 Drawing Sheets

VIRTUAL ENVIRONMENT FOR SERVER APPLICATIONS, SUCH AS WEB APPLICATIONS

BACKGROUND

Virtualization refers to the execution of a virtual machine by physical hardware and then running operating systems and applications on the virtual machine. The virtual machine may represent a least common denominator of hardware functionality or may represent a well-known configuration for which it is easy to prepare an operating system (OS) and applications. Many data centers use virtualization to be able to easily move a virtual machine to new physical hardware as resource requirements increase, for maintenance cycles, and to balance physical server loads. Virtualization is useful for many situations, but can also impose limitations that occur due to many virtual machines contending for the same resources (e.g., central processing unit (CPU), memory, and network interface card (NIC)).

Application virtualization provides a virtual environment at the level of a single application, isolating the application from the underlying OS similarly to the way a virtual machine isolates an OS from the underlying hardware. For example, an operating system may natively run some applications, while providing a virtual environment for running others. This may allow the operating system, for example, to run applications designed for a different operating system. Application virtualization blurs the distinction for the user between applications running natively in the host operating system and applications running in a virtual environment. For example, both types of applications may appear side by side in a taskbar or menu provided by the operating system shell. MICROSOFT Application Virtualization (App-V), for example, transforms applications into centrally managed virtual services that are not installed and do not conflict with other applications. In a physical environment, every application depends on its operating system (OS) for a range of services, including memory allocation, device drivers, and much more. Incompatibility between an application and its OS can be addressed by either server virtualization or presentation virtualization—but incompatibility between two applications installed on the same instance of an OS is solved by application virtualization.

Virtualizing server applications is typically more difficult than other applications. Unlike client applications that often are launched by a user from an operating system shell by running a dedicated executable, server applications may include operating system services, worker processes, and daemons that run on demand or on some schedule. Administrators would like to virtualize server applications, to make them as easy to deploy as copying a package or group of files to a computer system (e.g., xcopy deployable). Server components, such as MICROSOFT Internet Information Server (IIS) do not natively support application virtualization for applications that run using the component. Enterprises would like to virtualize server applications like IIS applications to be more dynamic—they could take the application from machine to machine without reinstalling the application each time. This is productivity saving for enterprises as they can load balance or maintain their servers with much lower overhead. IIS has the concept of a web application (e.g., a web site), and these web applications run inside application pools. IIS specifies this application pool name when creating a worker process to respond to requests for the website. One problem is that there can be conflicts on application names. For example, an administrator may want to virtualize several IIS applications on a single server, where each application (or application pool) has the standard name "Default." Doing this today causes a conflict so that only the first such web application will run correctly.

SUMMARY

An application virtualization system is described herein that enables server applications, such as web applications, to be easily deployable, separates an application and its state from the system, and allows applications to be easily moved to another server. The application virtualization system provides a way to isolate conflicts, such as web server application pool names, and allow multiple applications that provide conflicting information to run independently and avoid conflicts. The application virtualization system receives notification of an application preparation session and monitors the session to collect configuration information that the application uses to run on a client. The application virtualization system stores the collected information until the application to be virtualized is deployed. When an administrator later deploys the application, the system retrieves the stored information and uses the information and information from the client to reconstitute the metadata and virtualize the application. The application virtualization system extracts a request at packaging time and stores metadata about a web application, such as a name of the application's application pool. Upon later deploying the web application, the system consults the stored metadata to place the web application into the correct application pool associated with a virtual environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
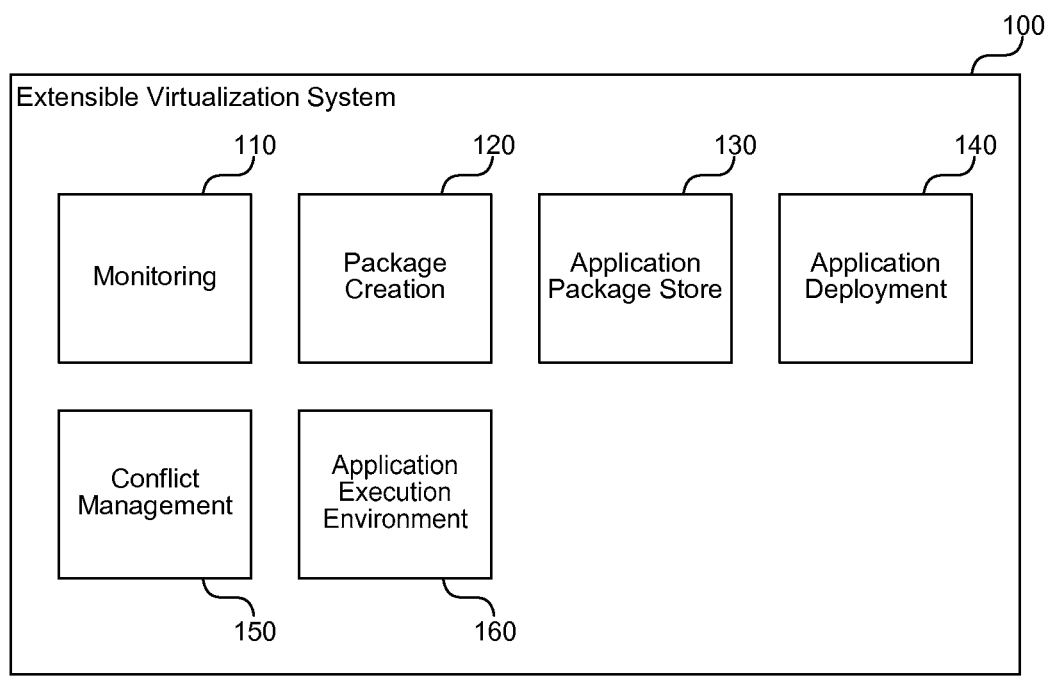
FIG. 1 is a block diagram that illustrates components of the application virtualization system, in one embodiment.

An application virtualization system is described herein that enables server applications, such as web applications, to be easily deployable, separates an application and its state from the system, and allows applications to be easily moved to another server. The application virtualization system provides a way to isolate conflicts, such as web server application pool names, and allow multiple applications that provide conflicting information to run independently and avoid conflicts. Virtualizing an application generally involves three steps: metadata extraction, metadata storage and reconstitution, and runtime management of requests. Metadata extraction is the process of knowing when an application is being prepared for virtualization and monitoring the application to extract configuration information. Configuration information can include any way in which an application ties itself to an operating system or other applications.

The application virtualization system receives notification of an application preparation session and monitors the session to collect configuration information that the application uses to run on a client. For example, the system may take a snapshot of configuration information before and after installation of the application and store the differences as application metadata. The application virtualization system stores the collected information until the application to be virtualized is deployed. When an administrator later deploys the application, the system retrieves the stored information and uses the information and information from the client to reconstitute the metadata and virtualize the application. For example, for MICROSOFT™ IIS the system may capture an application pool name to which IIS assigns the application and store the application pool name as metadata about the application to use and potentially modify during deployment. Upon later deploying the web application, the system consults the stored metadata to place the web application into the correct application pool associated with a virtual environment. Thus, the application virtualization system allows multiple server applications to run virtualized side-by-side on the same physical computer hardware and operating system.

There are many different types of server applications such as NT services, COM+ applications, WMI providers, SharePoint applications, and web (e.g., IIS) applications. Each have their own challenges in virtualizing them. Web applications, in particular, present some specifies challenges addressed herein.

The first challenge is that a web server controls when the web application is started and the process that is created to run the web application is a natively installed executable. For NT services it is easy to determine whether or not the service should be virtualized based on its file path. If the file path is within virtual package A, a virtualization layer can launch the NT service within the virtual environment for that package. If the path is within virtual package B, the virtualization layer can launch the NT service within that virtual environment, and so forth. If the path does not fall under any virtual package, then the service is not virtualized. For a typical web server like MICROSOFT™ IIS, the executable path is the same for all web sites or web applications hosted by the server, namely the path to a worker process such as w3wp.exe for IIS. However, the parameters to the worker process may differ, such as including an application pool name. The application virtualization system modifies the virtualization layer to use this information to detect web applications to virtualize and to modify how such applications are virtualized. For example, the system ensures that the application pool names do not overlap and maintains a map between application pool names and virtual packages. When the worker process is created, the system looks up the application pool name in the map to determine if the worker process should be virtualized.

Another challenge involves how to virtualize web server virtual directories that do not have an application pool associated with them (unlike web applications). The system solves this challenge by converting the virtual directory into a web application and associating an application pool with the web application.

Another challenge involves how to prevent configuration conflicts upon deploying web applications. Web configuration can be applied at different levels in IIS and other web servers. Configuration can be applied to the server, to the web site, and to web applications and virtual directories that descend from the web site in a hierarchy. Web application installers are free to configure the web server at any level. If the application virtualization system captured this configuration as is and deployed it at the same level, the system could cause conflicts and potentially break locally installed or other virtual web applications. A solution to this problem is to capture the configuration changes made above the web application we care about and apply them at the web application level during deployment so not to affect other web applications on the system. These and other details are described further herein.

The major responsibilities of an application virtualization subsystem are monitoring, visualization, registration, and runtime virtualization. Each of these is described separately herein.

Monitoring involves watching an installation process to detect changes made to a computer system. In some embodiments, an application called the Sequencer is responsible for the monitoring phase of application virtualization. Some subsystems may hook application-programming interfaces (APIs) to monitor the installation, and others may compare snapshots of the computer system state before and after the installation to detect changes. An example of the former is a virtual services subsystem hooks the CreateService( ) API to detect when new operating system services are added by an installer. The IIS subsystem described in the previous example, on the other hand, can gather the information it uses by comparing the IIS configuration before and after an install. For example, the MICROSOFT tool MSDeploy allows users to run what-if deployments tied to a specific web server. The same tool can be used with the application virtualization system to compare snapshots and generate a machine independent piece of metadata, such as an extensible markup language filed (e.g., sav_providers.xml). At the end of monitoring, the system removes any web server configuration that was set at the global level and applies the configuration to the individual web applications to help prevent conflicts during deployment. Additionally, if top-level web virtual directories were created during monitoring, the system converts these into web applications associated with an application pool that will allow that virtual directory to be virtualized at deployment.

Visualization involves showing an administrator preparing an application for virtualization a visual indication of the changes made by an application. The Sequencer displays the changes detected during monitoring in a series of tabs. The application virtualization system may invoke subsystems for virtualization particular application types, and each subsystem may provide a user interface for visualization that is appropriate for that subsystem. This eliminates the need for the Sequencer to have explicit knowledge of each subsystem during the visualization phase. The subsystems' visualization interfaces are responsible for displaying their results in a window created for them by a visualization application of the application virtualization system.

Registration involves preparing a target computer system to run a virtual application. Although virtual applications are not installed on the client, some information is published to the client to provide a seamless user experience (e.g., so that the application shows up in the Start Menu or so that a web application is available in a web server metabase). The application virtualization system publishes information collected by the subsystem during monitoring to appropriate configuration locations on the client. For example, virtual web applications have their application configuration and application pool information registered with the web server. Additionally, part of the registration process involves associating the application pool name with a particular virtual application. When the web application is instantiated on a client, the client will intercept the request to create a new web server worker process and if the worker process's application pool name matches one for a virtual application, the worker process is created within the appropriate virtual environment.

Another responsibility of the subsystem closely related to registration is configuration. Registration is performed once; however, configuration can occur many times after the system registers its components. An example of registration is creating the web sites, applications, and application pools described herein. An example of a configuration item is a database connection string. This value may need to change after the application is registered if the backend database for the application is moved. The applicable subsystem is responsible for applying any subsystem specific configuration values, such as configuration that requires specific knowledge of the subsystem to be applied (e.g., may need to be set by calling a specific API).

Runtime virtualization refers to the hooking of functions and altering the functions' behavior during runtime of a virtualized application so that the application can access its resources as if it is locally installed on the client. Runtime virtualization also refers to decision making of whether or not certain system processes (i.e., processes not part of the virtual application's package) should be virtualized. For example, the IIS subsystem determines whether the IIS worker process (e.g., w3wp.exe) should be virtualized based on an application pool name passed on the command line.

FIG. 1 is a block diagram that illustrates components of the application virtualization system, in one embodiment. The system 100 includes a monitoring component 110, a package creation component 120, an application package store 130, an application deployment component 140, a conflict management component 150, and an application execution environment 160. Each of these components is described in further detail herein.

The monitoring component 110 monitors an application being prepared for virtualization to detect configuration data associated with the application. The monitoring component 110 may iterate through registered subsystems asking each subsystem whether the subsystem is interested in handling the present application. The component 110 invokes one or more subsystems that indicate an interest in the application process so that the subsystems can monitor subsystem-specific configuration changes made by the application. The monitoring component 110 may also provide snapshot services to take a snapshot of the application before and after monitoring to detect configuration changes made by the application.

The package creation component 120 creates a package for storing configuration data related to the application being prepared for virtualization. The package may include various container file formats, which may include compression, authentication, encryption, or other processing, such as to make the package smaller or provide security or certainty of the author of a package. For example, the package can be a ZIP, CAB, or other archive file format suitable for storing many files and settings within a single file. The package creation component 120 creates the package when a new application is being prepared for virtualization and may store general configuration information and application-specific configuration information, such as that detected by a custom virtualization subsystem.

The application package store 130 stores application packages between monitoring of the application being prepared for virtualization and deployment of the virtualized application to one or more target computer systems. The application package store 130 may include various storage media, such as a file system, network based storage, cloud-based storage service, database, and so forth.

The application deployment component 140 deploys an application package to a target computer system so that the target computer system can invoke the virtualized application. The component 140 may perform application-specific configuration on the target system, such as adding file type associations, adding a link to the application package, performing operating system service configuration, and adding web server configuration information. The application deployment component 140 may invoke a subsystem associated with the application package to perform subsystem-specific registration tasks to prepare the virtualized application to run on the target computer system.

The conflict management component 150 detects configuration data associated with a virtualized application and modifies the configuration data to avoid conflicts with other virtual or non-virtual applications configured to run on the target computer system. For example, the component 150 detects name conflicts for web server applications that specify a named application pool in which to execute. The component 150 may also receive information from an administrator that determines the behavior used to manage conflicts. For example, an administrator may override the default behavior and specify a particular name in the instance of a naming conflict for a web application.

The application execution environment 160 provides a level of indirection between the virtualized application and a host operating system of the target computer system. The wrapper may be very thin allowing the application to run nearly natively, such as when the application is designed to run on the host operating system. Alternatively or additionally, the wrapper may provide APIs and satisfy other constraints expected by applications designed for other operating systems or operating system versions. Thus, the application execution environment 160 provides a virtual application with the environment for which the application was designed using the available resources of the host operating system. The application execution environment 160 also invokes an appropriate subsystem (or subsystems) to provide subsystem-specific handling of the virtualized application during run time.

The computing device on which the application virtualization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
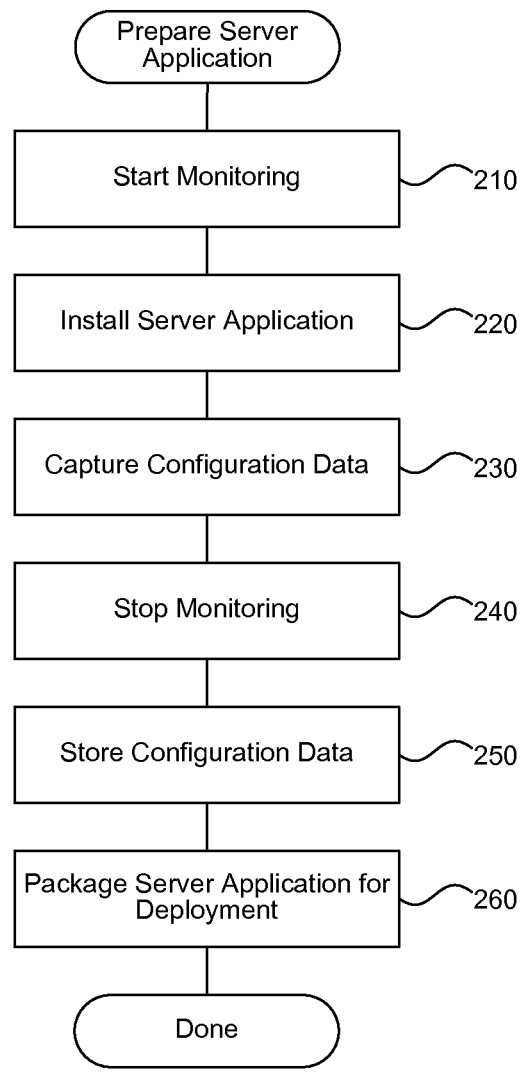
FIG. 2 is a flow diagram that illustrates processing of the application virtualization system to prepare a server application for virtualization, in one embodiment.

FIG. 2 is a flow diagram that illustrates processing of the application virtualization system to prepare a server application for virtualization, in one embodiment. Beginning in block 210, the system receives an indication to start monitoring a server application to be virtualized. For example, an administrator may launch the Sequencer described herein prior to installing a web application on a test server. The system may take a beginning snapshot to store a state of the test server prior to the installation of the server application for comparison with an ending snapshot taken after installation to detect configuration changes made by the server application during installation.

Continuing in block 220, the system begins installation of the server application. An administrator may run a setup program and the system may detect creation of a new process and inject a core virtualization system into the process. For example, if an administrator turns on monitoring and launches a server application, then the system may detect the launch of a worker process associated with the server application, start the core virtualization engine, and inject the core virtualization system into the work process so that, for example, the system can monitor API calls and other behavior of the process. Continuing in block 230, the system captures configuration data during installation of the server application. For example, the server application may provide an application name associated with a web or other application, configure a web server metabase with the name and other information, and so forth. The subsystem may detect files and registry keys modified by the process, as well as other configuration changes, such as MICROSOFT ACTIVE DIRECTORY or IIS metabase changes.

Continuing in block 240, the system concludes monitoring of the installation of the server application. For example, an administrator may inform the Sequencer described herein that the installation is complete or the system may automatically detect that the installation has finished. The system may take an ending snapshot of the server application and associated data to compare with a beginning snapshot taken earlier. Continuing in block 250, the system stores the captured configuration data for use during subsequent deployments of the server application. For example, the system may create an XML file or other data store and persist the configuration data to the data store for later retrieval.

Continuing in block 260, the system packages the server application for deployment, including the stored configuration data. For example, the system may create an archive file or other compact representation of the application that an administrator can easily deploy to other servers using tools such as xcopy or other file copying tools. After block 260, these steps conclude.

Figure 3:
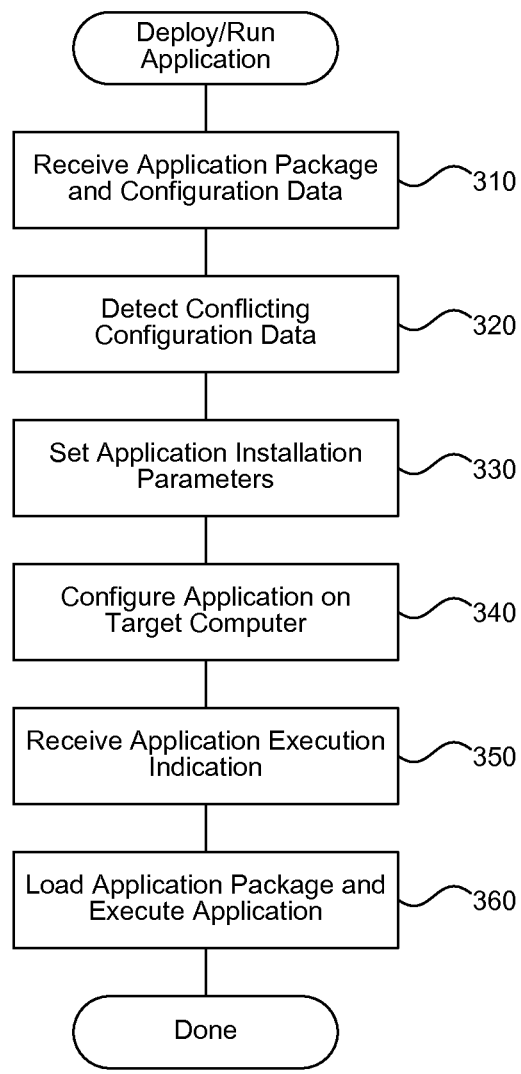
FIG. 3 is a flow diagram that illustrates processing of the application virtualization system to deploy and virtualize a server application, in one embodiment.

FIG. 3 is a flow diagram that illustrates processing of the application virtualization system to deploy and virtualize a server application, in one embodiment. Beginning in block 310, the system receives an application package that includes configuration data for a server application to deploy to a target computer. For example, the application package may include a directory of files or an archive file that includes an XML or other data store of configuration data detected during monitoring of the application as described herein. Continuing in block 320, the system detects configuration data in the received application package that may conflict with other applications running on the target computer. For example, if the server application is a web application, the system may detect whether an application pool name specified by the configuration data conflicts or might conflict with other web applications on the target computer.

Continuing in block 330, the system sets application installation parameters that will allow the server application to run on the target computer without conflicting with other applications on the target computer. For example, if the system detected a conflicting name in the prior step, then the system may set installation parameters with a modified name to avoid conflicts. In some embodiments, the system appends a globally unique identifier (GUID) to an application pool name to avoid conflicts with other application pools having the same name. The system may also receive override information from an administrator or other source that specifies substitute installation parameters to use for configuring the application.

Continuing in block 340, the system configures the target computer system to run the server application with the set application installation parameters. For example, the system may write configuration data to a configuration database, one or more files, a web server metabase, and so forth to configure the application. Configuring the application prepares the application to run on the target computer. For example, for a web application, configuration may include providing a virtual directory, port, and file locations for the web application to a web server application manager (e.g., IIS Manager).

Continuing in block 350, the system receives an application execution indication that indicates a request to launch the configured server application. For example, the indication may come from a request received over a network (e.g., to access a web page hosted by the server) or other source. In some embodiments, the system injects components into a server application management component to intercept calls to launch server applications. For example, web servers often include a management application that launches worker processes to handle each website hosted on a server. The system may intercept calls to invoke a worker process so that a virtual environment managed by the system can be substituted for native behavior of the management application.

Continuing in block 360, the system loads the application package associated with the received application execution indication and executes the application in a virtual environment. The system may load a module or other executable code associated with the application virtualization system to allow redirection of calls, API hooking, and other virtualization actions to provide the application with a virtual environment that imitates an environment for which the application was designed. The system may also invoke one or more virtualization subsystems to handle various types of requests that the application might make, such as file access requests, registry access requests, web server-specific requests, and so forth. As the application executes, any hooks or other indirection procedures put in place by the virtualization subsystems allow the system to handle any application requests that require redirection or other handling to permit the isolation provided by virtualization. After block 360, these steps conclude.

Figure 4:
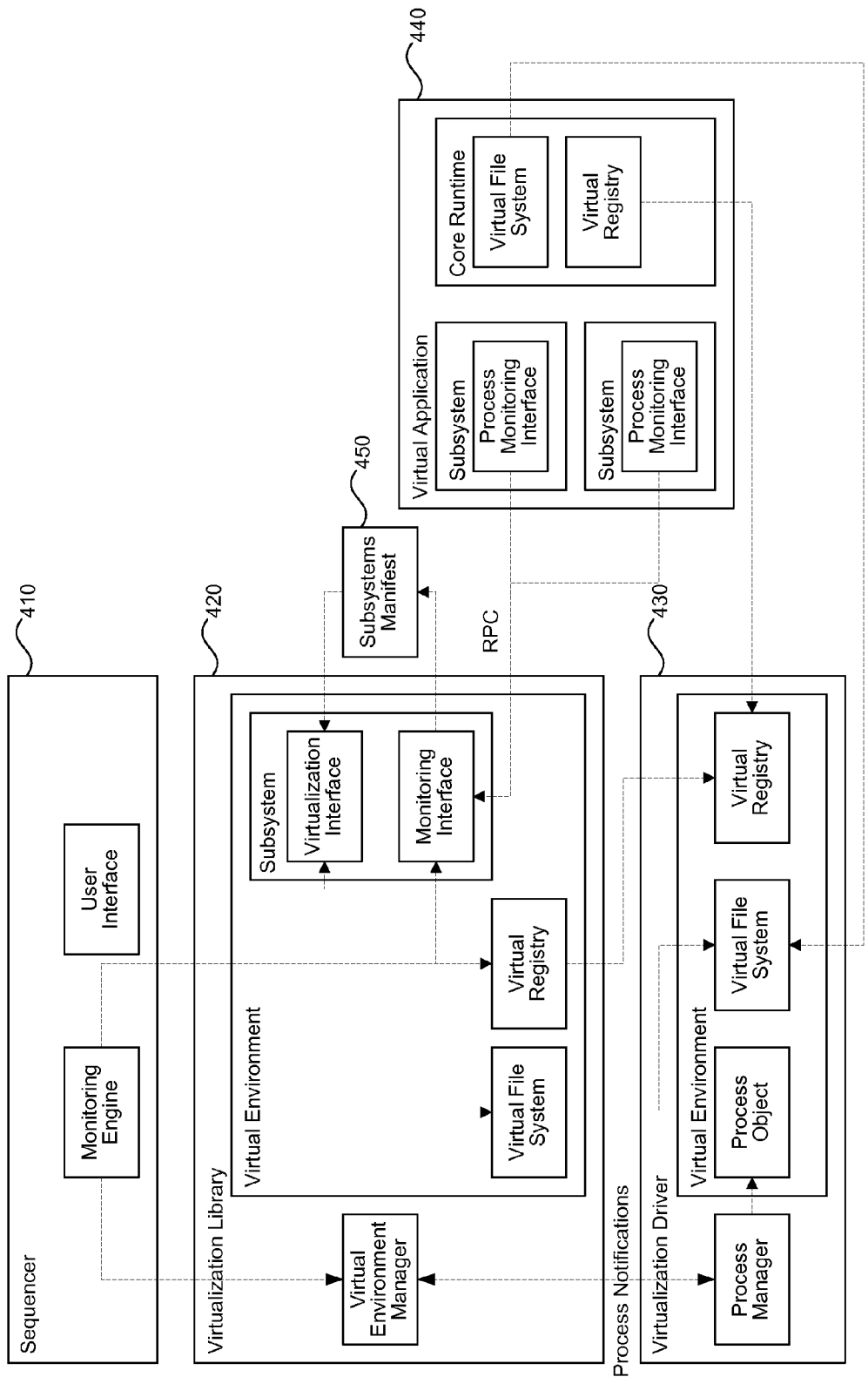
FIG. 4 is a block diagram that illustrates an operating environment and implementation components of the application virtualization system, in one embodiment.

FIG. 4 is a block diagram that illustrates an operating environment and implementation components of the application virtualization system, in one embodiment. In some embodiments, the application virtualization system uses an operating system driver 430 and several user mode components to virtualize applications. The virtualization driver 430 (e.g., sftplay.sys) manages virtual environments at a kernel level of the operating system. A process manager component of the driver maintains a process ID to virtual environment mapping. As processes are created, the process manager component automatically adds child processes to a parent process's virtual environment. The process manager component also notifies the user-mode virtualization library 420 about virtual process creation and termination and when there are no processes left running within a virtual environment.

One role of the driver 430 is to perform registry and file system virtualization. Registry and file mapping information is uploaded to the driver 430 when a virtual environment is first created using the virtualization library 420. The driver 430 uses this information to alter the behavior of the registry and file system APIs so that to the virtual application 440 it appears as if the application is locally installed on a target computer system.

The user-mode virtualization library 420 (e.g., osguard.lib) contains APIs to manage virtual environments and processes and is the interface between user mode and the virtualization driver 430. The virtualization library 420 also has virtual subsystems built into it, including virtual file system and virtual registry, that are used across various application subsystems. The virtualization library 420 is used to package virtual applications as well as at run time. The sequencer 410 is an application used by administrators to package virtual applications by monitoring the install process, and the listener (not shown) is an operating system service that manages virtual applications at runtime.

A virtualization runtime module (e.g., sftldr.dll) is a library injected into each virtual process, either by the virtualization library 420 or by itself when creating child processes. A detours library is used to hook functions within the virtual application 440 process. Some calls are redirected to the virtualization driver 430 for registry and file system virtualization; the others make RPC calls into the virtualization library 420 to perform their respective subsystem virtualization.

During its initialization, the virtualization library 420 dynamically loads each subsystem module listed in the registry and stores pointers to their factory interfaces. When the sequencer 410 or listener uses the virtual environment manager to create a virtual environment, the factories are used to create an instance of each subsystem. The subsystem instances are stored within the virtual environment object and can be retrieved by the sequencer or the listener.

Many subsystems need access to the virtual file system and registry to perform their virtualization. For example, both virtual COM and virtual services subsystems need access to the virtual registry keys to create virtual COM objects and start virtual services respectively. Therefore, the virtual registry and file system subsystems are not generalized but rather are core components, in some embodiments. Subsystems can get access to these core subsystems through the virtual environment object passed to them through their monitoring and runtime interfaces.

The monitoring interface stores the subsystem changes it detected within a manifest 450 file. This manifest 450 is passed to other interfaces including the visualization interface, which displays and allows this information to be edited, and the registration interface, which uses the information to register components.

In some embodiments, the application virtualization system allows administrators to override the application pool name for a virtualized web application. For example, an administrator may want to configure two web applications to run in the same pool. In some cases, the web application may be designed to use a certain name, and the administrator can modify sav_providers.xml or another location for storing application metadata to use that application pool name, so that the web application will continue to function correctly.

In some embodiments, the application virtualization system runs multiple server applications in a single virtual environment. Although the separate virtual environments per application described herein may be desirable in many cases, the system can also virtualize applications in a single environment. For example, an administrator may want to conserve resources of a target computer system or related applications may want to communicate with one another in a manner not allowed by the isolation of multiple virtual environments.

From the foregoing, it will be appreciated that specific embodiments of the application virtualization system have been described herein for purposes of illustration, but that various modifications may be made without deviating from the spirit and scope of the invention. Accordingly, the invention is not limited except as by the appended claims.

We claim:

1. A computer-implemented method for preparing a web server application for virtualization, the method comprising:
receiving an indication to start monitoring a web server application to be virtualized, wherein the application is invoked using a native, non-virtualized process of a web server having parameters that specify a particular web application;
beginning installation of the web application;
capturing configuration data during installation of the web application, including the parameters that invoke the web application;
concluding monitoring of the installation of the web application;
storing the captured configuration data for use during a subsequent deployment of the web application; and
packaging the web application for deployment, including the stored configuration data,
wherein the preceding steps are performed by at least one processor.

2. The method of claim 1 wherein receiving an indication to start monitoring comprises detecting that an administrator launched an application monitoring tool.

3. The method of claim 1 wherein monitoring comprises taking a beginning snapshot to store a state of a test server prior to the installation of the web application for comparison with an ending snapshot taken after installation to detect configuration changes made by the web application during installation.

4. The method of claim 1 wherein beginning installation comprises detecting creation of a new process and injecting a core virtualization system into the process.

5. The method of claim 1 wherein capturing configuration data comprises detecting an application pool name associated with a web application.

6. The method of claim 1 wherein capturing configuration data comprises detecting one or more files, registry values, or application-specific configuration settings modified by the web application during installation.

7. The method of claim 1 wherein concluding monitoring comprises taking an ending snapshot of the web application and associated data to compare with a beginning snapshot taken prior to installation.

8. The method of claim 1 wherein storing the captured configuration data comprises creating an XML file and persisting the configuration data to the XML file for later retrieval.

9. The method of claim 1 wherein packaging the web application comprises creating an archive file that contains one or more files and configuration data associated with the web application.

10. A computer system for virtualizing server applications hosted within a host process, the system comprising:
- a processor and memory configured to execute software instructions;
- a monitoring component configured to monitor an application hosted within a host process, wherein the hosted application is being prepared for virtualization and is monitored to detect configuration data associated with the hosted application;
- a package creation component configured to create a package for storing configuration data related to the hosted application being prepared for virtualization;
- an application package store configured to store application packages between monitoring of the hosted application being prepared for virtualization and deployment of the virtualized application to one or more target computer systems;
- an application deployment component configured to deploy an application package to a target computer system so that the target computer system can invoke the virtualized application;
- a conflict management component configured to detect configuration data associated with a virtualized application and modify the configuration data to avoid conflicts with other virtual or non-virtual applications configured to run on the target computer system; and
- an application execution environment configured to provide a level of indirection between the virtualized application and a host operating system of the target computer system.

11. The system of claim 10 wherein the monitoring component is further configured to hook application programming interfaces (API) to detect configuration changes made by the application as the changes are requested.

12. The system of claim 10 wherein the package creation component is further configured to create the package when a new application is being prepared for virtualization and to store application-specific configuration information in association with the package.

13. The system of claim 10 wherein the application deployment component is further configured to perform application-specific configuration on the target system that includes registering the application with a web application management component.

14. The system of claim 10 wherein the application deployment component is further configured to invoke a subsystem associated with the application package to perform subsystem-specific registration tasks to prepare the virtualized application to run on the target computer system.

15. The system of claim 10 wherein the conflict management component is further configured to detect name conflicts for web server applications that specify a named application pool in which to execute and to modify a name not to conflict with other applications.

16. The system of claim 10 wherein the conflict management component is further configured to receive information from an administrator that overrides default behavior of the component and specifies a particular application pool name to avoid a naming conflict for a web application.

17. The system of claim 10 wherein the application execution environment is further configured to invoke an appropriate subsystem to provide subsystem-specific handling of the virtualized application during run time.

18. The system of claim 10 wherein the application execution environment detects launching of applications in a worker process on the target computer system.

19. A computer-readable storage medium comprising instructions for controlling a computer system to deploy and virtualize a server application, wherein the instructions, when executed, cause a processor to perform actions comprising:
- receiving an application package that includes configuration data for a server application hosted within a host process to deploy to a target computer;
- detecting configuration data with parameters for modifying the host process in the received application package that may conflict with other applications running on the target computer;
- setting application installation parameters that will allow the server application to run on the target computer without conflicting with other applications on the target computer;
- configuring the target computer system to run the server application with the set application installation parameters;
- receiving an application execution indication that indicates a request to launch the configured server application; and
- loading the application package associated with the received application execution indication and executing the application in a virtual environment.

20. The medium of claim 19 wherein detecting configuration data comprises determining that the server application is a web application and detecting whether an application pool name specified by the configuration data conflicts with other web applications on the target computer.

* * * * *